US007237252B2

(12) United States Patent
Billmaier

(10) Patent No.: US 7,237,252 B2
(45) Date of Patent: Jun. 26, 2007

(54) METHOD AND APPARATUS TO INVOKE A SHOPPING TICKER

(75) Inventor: James A. Billmaier, Woodinville, WA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 10/186,286

(22) Filed: Jun. 27, 2002

(65) Prior Publication Data

US 2004/0003406 A1 Jan. 1, 2004

(51) Int. Cl.
*H04N 7/025* (2006.01)
(52) U.S. Cl. .............................. 725/43; 725/40; 725/44; 725/45; 725/46; 725/51; 725/52; 725/60; 725/61; 715/716; 715/738; 715/774; 715/744; 715/745; 715/746
(58) Field of Classification Search ............... 725/40, 725/42, 43, 51, 52, 60, 61, 32–36, 135–136, 725/139–140; 715/716, 738, 774, 744–746; 705/77–80, 14, 16, 26–27
See application file for complete search history.

(56) References Cited

U.S. PATENT DOCUMENTS

| 5,559,548 | A | * | 9/1996 | Davis et al. .................. 725/40 |
| 5,589,892 | A | * | 12/1996 | Knee et al. ................... 725/43 |
| 5,592,212 | A | | 1/1997 | Handelman ................... 348/12 |
| 5,594,509 | A | * | 1/1997 | Florin et al. .................. 725/43 |
| 5,880,720 | A | * | 3/1999 | Iwafune et al. .............. 725/24 |
| 6,002,394 | A | * | 12/1999 | Schein et al. ................. 725/39 |
| 6,016,141 | A | * | 1/2000 | Knudson et al. ............. 345/721 |
| 6,052,145 | A | | 4/2000 | Macrae et al. ................ 348/10 |
| 6,177,931 | B1 | * | 1/2001 | Alexander et al. ............ 725/52 |
| 6,182,098 | B1 | | 1/2001 | Selker ......................... 707/526 |
| 6,233,734 | B1 | | 5/2001 | Macrae et al. ................ 725/50 |
| 6,243,142 | B1 | * | 6/2001 | Mugura et al. ............. 348/564 |
| 6,282,713 | B1 | * | 8/2001 | Kitsukawa et al. ........... 725/36 |
| 6,348,932 | B1 | | 2/2002 | Nishikawa et al. ......... 345/719 |
| 6,351,270 | B1 | * | 2/2002 | Nishikawa et al. ......... 345/717 |
| 6,392,664 | B1 | * | 5/2002 | White et al. ................ 345/717 |
| 6,412,110 | B1 | * | 6/2002 | Schein et al. ................. 725/40 |

(Continued)

OTHER PUBLICATIONS

"ESPN.com BottomLine" Sports Ticker web pages printed from http://espn.go.com/bottomline/, printed Mar. 5, 2002.

(Continued)

*Primary Examiner*—Jason Salce
(74) *Attorney, Agent, or Firm*—Darby & Darby PC; Bruce E. Black

(57) ABSTRACT

A shopping ticker can be invoked when the viewer presses a BUY button on a remote control while a television program is being shown. The television program, which can be a commercial, may not necessarily have an interactive commerce opportunity originally associated with it. However, instead of ignoring a signal sent from the remote control when the BUY button is pressed, the signal is processed to invoke the shopping ticker. The shopping ticker can include advertisements, links to e-commerce opportunities (including merchant web sites), product information, or other information that may be potentially useful to help initiate a transaction with the viewer, including context-sensitive shopping information that is related to the subject matter of the television program. A commerce opportunity is thus created in a situation where there originally would not have been such an opportunity and where the viewer's remote control action would otherwise have been ignored.

37 Claims, 6 Drawing Sheets

U.S. PATENT DOCUMENTS

| | | | |
|---|---|---|---|
| 6,414,720 B1 | 7/2002 | Tsukidate et al. | 348/469 |
| 6,415,438 B1* | 7/2002 | Blackketter et al. | 725/136 |
| 6,460,180 B1* | 10/2002 | Park et al. | 725/40 |
| 6,519,771 B1* | 2/2003 | Zenith | 725/32 |
| 6,526,577 B1* | 2/2003 | Knudson et al. | 725/40 |
| 6,536,041 B1* | 3/2003 | Knudson et al. | 725/39 |
| 6,557,171 B1 | 4/2003 | Sonoda et al. | 725/136 |
| 6,557,172 B1* | 4/2003 | Carr | 725/139 |
| 6,559,866 B2* | 5/2003 | Kolde et al. | 345/765 |
| 6,560,777 B2* | 5/2003 | Blackketter et al. | 725/110 |
| 6,571,392 B1* | 5/2003 | Zigmond et al. | 725/110 |
| 6,604,242 B1* | 8/2003 | Weinstein et al. | 725/109 |
| 6,668,378 B2* | 12/2003 | Leak et al. | 725/136 |
| 6,678,891 B1* | 1/2004 | Wilcox et al. | 725/42 |
| 6,711,552 B1* | 3/2004 | Kay et al. | 705/26 |
| 6,714,992 B1* | 3/2004 | Kanojia et al. | 719/321 |
| 2001/0042251 A1 | 11/2001 | Marshall et al. | 725/60 |
| 2002/0040482 A1 | 4/2002 | Sextro et al. | 725/136 |
| 2002/0059594 A1 | 5/2002 | Rasmussen et al. | 725/37 |
| 2002/0124252 A1* | 9/2002 | Schaefer et al. | 725/33 |
| 2003/0088517 A1 | 5/2003 | Medoff | 705/59 |

OTHER PUBLICATIONS

"Liberate TV Ticker" web pages printed from http://solutions.liberate.com/products/tv_ticker.html, printed May 30, 2002.

Office Action mailed Nov. 10, 2003 for U.S. Appl. No. 10/186,341, filed Jun. 27, 2002.

Office Action mailed May 21, 2004 for U.S. Appl. No. 10/186,341, filed Jun. 27, 2002.

Office Action mailed Dec. 1, 2004 for U.S. Appl. No. 10/186,341, filed Jun. 27, 2002.

Office Action mailed Jul. 13, 2005 for U.S. Appl. No. 10/186,341, filed Jun. 27, 2002.

Brown, Mark R. "Using Netscape 2" Second Edition, Que Corporation, 1995, pp. 290-291.

* cited by examiner

METHOD AND APPARATUS TO INVOKE A SHOPPING TICKER

BACKGROUND OF THE INVENTION

1. Field of the Invention

This disclosure relates generally to presentation of information on a display device, and in particular but not exclusively, relates to presentation of an interactive television "ticker" for shopping.

2. Description of the Related Art

An important business element in the production and distribution of television programming is revenue received from manufacturers and service providers who pay to advertise their products. The ubiquitous television commercial is the manifestation of this enterprise. The survival of a television program is heavily dependent on the advertising revenue that can be realized from the television program. Advertisers in turn rely on the ability of the television program to draw viewers who then become potential purchasers of the advertised products.

Television and interactive technologies are beginning to converge. In a typical scenario, a television commercial can be provided with a "trigger" that renders an icon on television display screen, signaling to the viewers that there is a potential e-commerce opportunity. Once this icon is seen, the viewer can press a "BUY" button or other button on a remote control to initiate an e-commerce transaction.

Viewers can then obtain information about goods and services that are advertised in the commercial by, for example, connecting to the Internet (via the BUY button and a set top box) while viewing the commercial and ordering the advertised products. A user interface for this e-commerce transaction can comprise a hypertext markup language (HTML) web page or pop-up window that is rendered on the display screen as an overlay over the current television program or in full screen. Picture-in-picture (PIP) features are also available, where the e-commerce window is displayed concurrently with the television program image (or vice versa).

Unfortunately, not all commercials or other television programming are accompanied by e-commerce or informational opportunities. The content provider, merchant, advertiser, or broadcaster, for instance, may have chosen not to provide (or did not have the capability to provide) an interactive e-commerce experience along with the particular piece of television programming. Because of this, there is typically no icon that is rendered on the television display screen to indicate availability of an e-commerce opportunity under such circumstances. Thus, when the viewer presses the BUY button on the remote control, the set top box will generally ignore the resulting signal or command that is sent from the remote control and will not render anything on the display screen. Viewer frustration is likely to result as the viewer continues to press the BUY button and wonder why nothing is being displayed to allow him to make a purchase.

This situation is wasteful of a potential revenue opportunity, since the viewer has indicated an interest in making a purchase by pressing the BUY button. Moreover, the potential revenue opportunity is lost whether the viewer did deliberately press the BUY button in response to an advertisement in a commercial or whether it was pressed accidentally (such as by sitting on the remote control, intending to press a different button, exploring the buttons of the remote control, kids playing with the remote control, etc.). Either way, the signal from the remote control is ignored and no commerce opportunity is provided to the viewer.

This is an unfortunate situation given that some studies have shown that viewers are generally annoyed by or unresponsive to commercials, banner advertisements, advertisement pop-up windows, etc. Advertisers and other parties thus have to make the most out of fleeting opportunities when they have (or can potentially obtain) viewers' attention and interests in purchasing an advertised product. The ultimate success of advertising is dramatically reduced when, as described above, no response is provided to the viewer when the viewer presses the BUY button on the remote control.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
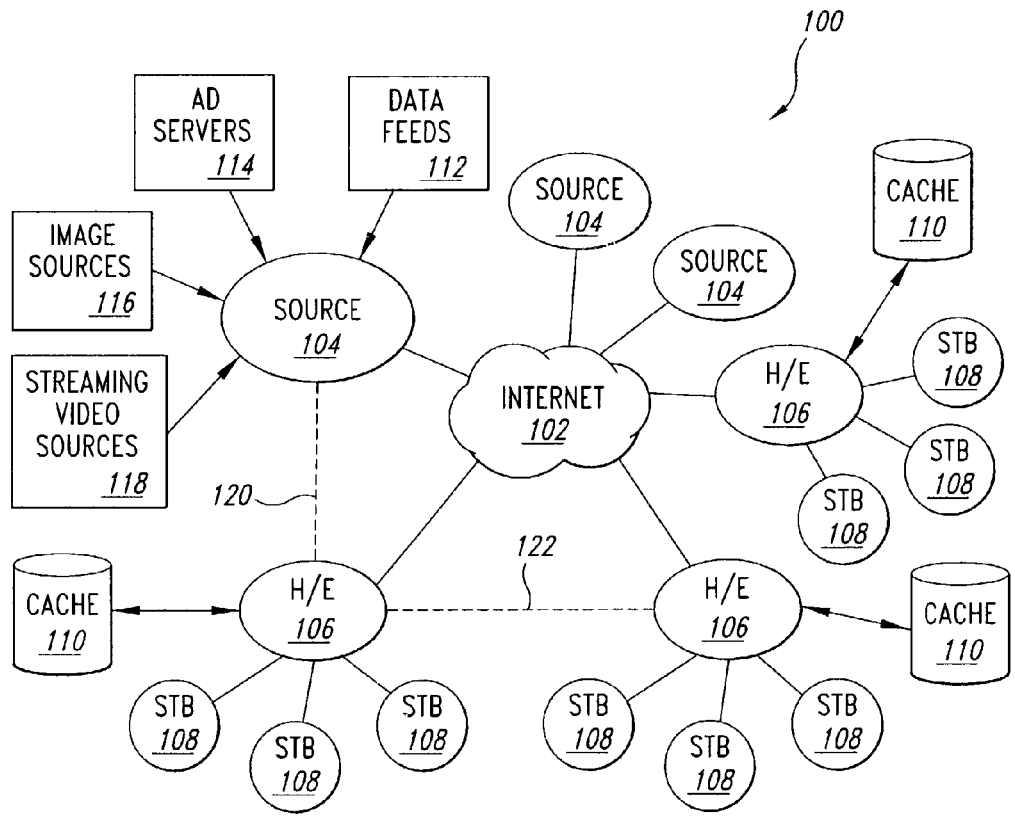
FIG. 1 is a block diagram of an example interactive video casting system that can implement a shopping ticker in accordance with an embodiment of the invention.

Embodiments of techniques to invoke a shopping ticker, such as when a viewer presses a BUY button while watching television, are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides an interactive shopping ticker. The shopping ticker can be invoked when the viewer presses a BUY button (or other button) on a remote control while a television program is being shown on a television set. The television program, which can be a commercial, may not necessarily have an interactive commerce opportunity associated with it when the BUY button is pressed. However, instead of ignoring a signal sent from the remote control when the BUY button is pressed, software in a set top box (or other client terminal) responds to the signal by invoking the shopping ticker.

The shopping ticker can include advertisements, links to e-commerce opportunities (including merchant web sites), product information, or other information that may be potentially useful to help initiate a transaction with the viewer. Therefore, a commerce opportunity is created in a situation where there would not have been such an opportunity associated with the current television program and where the viewer's remote control action would otherwise have been ignored.

According to various embodiments, the advertisements and other shopping information presented in the ticker can be context-sensitive in that they relate to the subject matter of the television program currently being shown. Thus, while the television program itself does not provide an interactive commerce opportunity, its subject matter can be used to select context-related information for the shopping ticker, thereby presenting the viewer with information that is directly responsive to his interests that originally motivated him to press the BUY button. In other situations, where the viewer did not intentionally press the BUY button (e.g., the BUY button was pressed accidentally), the shopping ticker at least provides context-sensitive information that may motivate the viewer to conduct a transaction. One technique to provide context-sensitive information in the shopping ticker is through the use of triggers, for instance.

Moreover, the term "ticker" as used herein is intended to generally describe a presentation of information on a display screen, such as a display screen for a television, and is not intended to be limited solely to implementations where the information is presented in a manner to exactly mimic a stock market ticker. In one embodiment, the ticker can comprise text and graphics that are scrolled or otherwise presented in a region of the display screen, along with a television image (such as an image from a live broadcast or from a recorded program). Various embodiments will be described herein in the context of "scrolling" the ticker information. It is to be appreciated that the term "scrolling" is merely illustrative of a technique to present dynamic ticker information, and that this term, in some embodiments, can encompass implementations where the ticker information is presented via screen segments of information, text segments, one-line-at-a-time, one-sentence-at-a-time, one-word-at-a-time, and the like, rather than the traditional format of one-character-at-a-time typically associated with stock market tickers. Moreover, the term "scrolling" is used generically herein for simplicity to refer not only to vertical movement from bottom to top, but also movement from right to left (often referred to as "crawl") or movement in other directions.

FIG. 1 shows an example of an interactive video casting system 100 for distributing ticker content, Internet content, and television content according to an embodiment of the invention. In accordance with an embodiment of the present invention, the system 100 can be integrated with a cable television distribution system to provide interactive television tickers. The system 100 includes an Internet 102, a plurality of content sources 104, a plurality of distribution centers (depicted as the head-ends or H/Es 106), and a plurality of client terminals 108 (depicted as set top boxes). In addition, a content source 104 is depicted as receiving data from data feeds 112, advertisement servers 114, image sources 116, and streaming video sources 118. The content source 104 may also receive content from a broadcast video source. For the sake of clarity and to avoid clutter, not all of these sources are shown in FIG. 1 for each content source 104.

The plurality of content sources 104 is coupled to the Internet 102. For example, a content source 104 may comprise a web site portal such as Go2Net.com™, or a news web site such as CNN.com™, or other types of sources. Each content source 104 may have various data feeds 112, servers 114, and sources 116/118 coupled to it.

Figure 2:
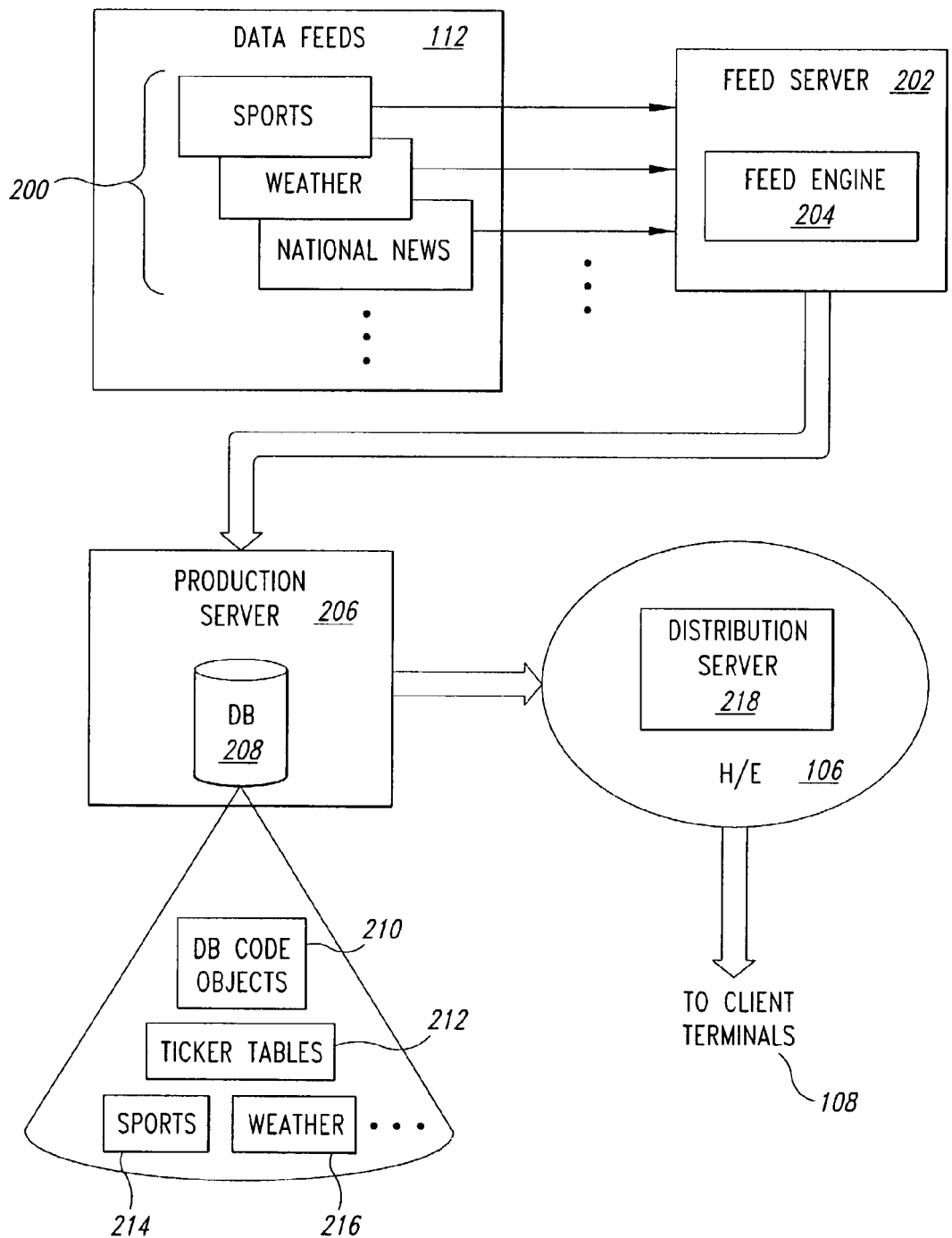
FIG. 2 is a block diagram illustrating example components that can be included in the system of FIG. 1 to provide a shopping ticker in accordance with an embodiment of the invention.

For example, news or stock quote feeds 112 (including data for tickers) may be fed into the content source 104. Servers 114 may provide advertisements for insertion into multimedia content delivered by the content source 104 in accordance with one embodiment of the invention. Sources 116 and 118 may provide images 116, streaming video 118, and other content to the content source 104. Various other feeds, servers, and sources may also be coupled to the content source 104 of FIG. 1. An example configuration of components that can be integrated with the system 100 to provide ticker information to client terminals 108 is shown in FIG. 2.

The Internet 102 comprises a network of networks and is well known in the art. Communications over the Internet 102 can be accomplished using standard protocols such as transmission control protocol/internet protocol (TCP/IP), hypertext transfer protocol (HTTP), file transfer protocol (FTP), or other protocols. Web sites, such as merchant web sites, can be included within or otherwise be in communication with the Internet 102. The Internet 102 is coupled to the plurality of distribution centers 106, and each distribution center 106 is in turn coupled to a plurality of client terminals 108, which may comprise a set top box, a PC, an interactive television set, or another type of communication device or display device.

In alternative or in addition to the Internet 102 being used to distribute multimedia content (including ticker data and advertisements) from the content sources 104 to distribution centers 106, communications channels or networks 120 (which can include satellite delivery sources/networks) apart from the Internet 102 may couple one or more content sources 104 to one or more distribution centers 106. One example of such an alternate path for communications is illustrated by a first dashed line 120 in FIG. 1. Alternately or additionally, peering connections may exist between distribution centers 106. One example of such peering is illustrated by a second dashed line 122 in FIG. 1. Other communications configurations are also possible and are included within the scope of the present invention.

Caches 110 may be provided at (or otherwise coupled to) the distribution centers 106. Such caches 110 may be used to increase the performance in the delivery of multimedia content (including ticker data and advertisements) to the client terminals 108. For example, larger files for video and other high bandwidth content may be stored in such caches 110, which may be closer-in-time to the client terminals 108 than to the content sources 104. In addition, reliability and guaranteed bandwidth may be provided because the Internet 102 is not in-between such caches 110 and the client terminals 108. In one embodiment, the caches 110 or other storage media in the system 100 can store ticker information and advertisements, rather than or in addition to having such information buffered, cached, or otherwise stored at the client side.

In an embodiment, servers may be present in the distribution centers 106, with such servers including or being coupled to the caches 110 or other storage media. Alternatively or in addition, these servers may be located remotely from but still communicatively coupled to the distribution centers 106, via the Internet 102 or other communications channels or networks. Examples of such servers that can be used in connection with providing ticker information to client terminals 108 are shown in FIG. 2.

In accordance with one embodiment of the invention, different or multiple portals may be used to access the information provided through the interactive video casting systems of FIG. 1, based on the type of client terminal being used by the end user. That is, for example, a television portal may be provided for an end user that uses a television set coupled to the client terminal 108 to access the information. A PC portal may be provided for an end user that uses a PC to access the information. Portals can be provided for end users that use cellular telephones, personal digital assistants (PDAs), audio devices, and the like to access the interactive video casting system 100 of FIG. 1.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the particular client terminal 108.

In another embodiment, a cable service provider can deliver signals having different formats to the various client terminals 108, with the client terminals not necessarily having special adapters. Therefore, as an example, the cable service provider or other party can generate/deliver information (e.g., television programming, web page content, ticker information, and the like) having a format that is compatible for end users that receive the information via a television set. The cable service provider or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information and other information over any network and any network-compatible device by broadcasting, multicasting, or unicasting. An "interactive television system" is one type of or one means of access to an "interactive video casting system."

FIG. 2 is a block diagram illustrating example components that can be included in the system 100 of FIG. 1 to provide data for tickers in accordance with an embodiment of the invention. The data feeds 112 include a plurality of different ticker data feeds 200 that provide a variety of different topical data that can be displayed in a ticker. For instance, the different ticker data can include sports data, weather data, national news, and so forth. The sources that can provide this data can include entities such as Reuters™, The Sporting News™ (TSN), Associated Press™ (AP™), and others (including feeds that can provide advertisements or other shopping-related ticker data). In one embodiment, the ticker data from the data feeds 200 comprises "raw" unformatted data (e.g., data with minimal or no formatting or graphics).

The raw ticker data is provided to a feed server 202. In an embodiment, the feed server 202 operates as a content aggregator that pulls or otherwise receives the raw ticker data from the data feeds 200. The feed server 202 also performs data manipulation on the received ticker data to manipulate the data into a database format so that the data can be indexed and stored. A feed engine 204, which can be embodied in software or other machine-readable instructions stored on one or more machine-readable media according to an embodiment, can reside and run in the feed server 202 to perform at least some of this data manipulation.

The feed server 202 is coupled to provide the manipulated ticker data to a production server 206. The production server 206 includes or is otherwise coupled to a database 208. The feed engine 204 calls on the database 208, and instructs the database 208 where to place the various ticker data. For example, the database 208 can include a plurality of database code objects 210 that cooperate with ticker tables 212 (such as a sports table 214, a weather table 216, and so forth) to index or store ticker data. The feed engine 204 calls the database 208 and identifies the database code objects and ticker tables where the ticker data is to be stored.

The various components of the database 208, such as the ticker tables 212, can also be configured in a manner that optimizes the organization and distribution of the ticker data. For example, ticker data unique to various geographic regions can be segregated from or otherwise identifiable from each other, so that ticker data that is relevant to only particular client terminals 108 need not be broadcast to all client terminals. For instance, California weather information can be segregated from Oregon weather information in the database 208 in a manner that client terminals 108 of California users do not receive Oregon weather information, unless specifically requested. This feature improves transmission efficiency and transmission time, since the bandwidth of communication paths to certain client terminals 108 are not clogged by non-relevant ticker data.

In an embodiment, the production server 206 can also perform data manipulation, such as before the data is stored in the database 208, while it is stored in the database 208, or after the data is retrieved from the database 208 for transmission to client terminals 108. For instance, the production server 206 can perform data manipulation to place the ticker data into a format that is "consumable" or otherwise compatible with operating software of the client terminals 108. For instance, the production server 206 can place the ticker data into formats such as hypertext markup language (HTML), extensible markup language (XML), or other suitable formats.

The production server 206 is coupled to provide ticker data from the database 208 to one or more distribution servers 218, which may be located in or otherwise communicatively coupled to a distribution center 106 (such as a head-end). The distribution server 218 operates to provide the ticker data to the client terminals 108 via several possible communication paths or channels, as will be described with reference to FIG. 3.

It is to be appreciated that the components shown in FIG. 2 are merely illustrative of the various components of one embodiment that can be used to provide ticker information. For example, other embodiments can use more or fewer servers, as well as different components, to perform the various operations. Moreover, the various servers and their components (such as the feed engine 204 and the database 208) can be distributed elsewhere in the system 100, instead of or in addition to the locations shown in FIG. 2. There may be multiple feed servers 202, production servers 206 and databases 208, distribution servers 218, and so on to account for load balancing, redundancy in case of outages or broken connections, and other factors that can affect distribution of ticker information.

Figure 3:
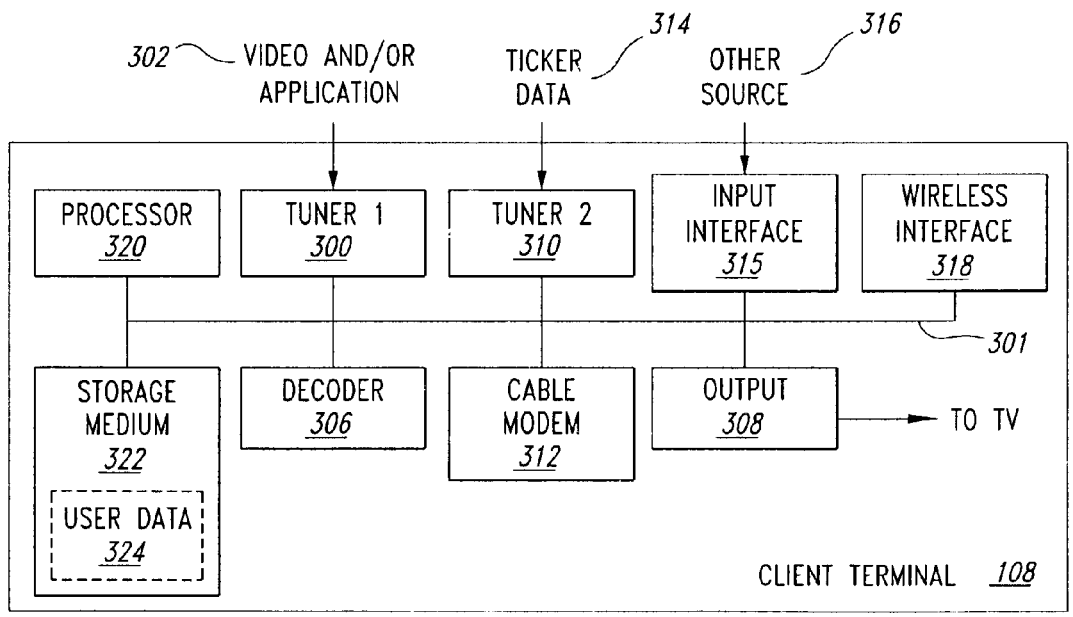
FIG. 3 is a block diagram of an embodiment of a client terminal that can be used in the system of FIG. 1 to present a shopping ticker.

FIG. 3 is a block diagram of an embodiment of a client terminal 108 for the system 100 of FIG. 1 that can implement an embodiment of the invention to present a shopping ticker. For the sake of simplicity of illustration and explanation, only the components that are germane to understanding an embodiment of the invention are shown in FIG. 3. It is understood that the embodiment of the client terminal 108 shown in FIG. 3 can have other components different than or in addition to what is shown. Moreover, the various illustrated components may be suitably combined in some embodiments, instead of being separate. It also should be noted that the client terminal 108 is only one embodiment of the invention and that some or all of the components described as embodied in the client terminal 108 can be incorporated into a client television rather than in a separate device. A bus 301 is shown symbolically to depict coupling between the various components.

To briefly describe an embodiment, the client terminal 108 receives ticker data and advertisement data from the distribution server 218 or other sources, and then performs the appropriate processing of the data to allow the data to be displayed in a ticker on a display screen of a television set. The client terminal 108 can be passive in that it receives the ticker data (as well as updates) and when the data is sent by the distribution server 218, independently of whether the client terminal 108 requested the ticker data (e.g., the distribution server 218 "pushes" the data to client terminals 108). Alternatively or in addition, the client terminal 108 can poll or otherwise explicitly request the data from the distribution server 218, including polling the distribution server 218 for updated data (e.g., the client terminal 108 "pulls" the data from the distribution server 218). In some embodiments, both push and pull mechanisms may be involved.

Once it receives the ticker data from the distribution server 218, the data can be buffered or cached (if appropriate), and processed for presentation on the display screen of the television set. In an embodiment, ticker software in the client terminal 108 can work in conjunction with a ticker template or other ticker user interface to display the ticker (and its ticker items) in the appropriate scrolling layout, format, locations, time intervals, topics, content, and so forth. In one embodiment where the ticker data is obtained from the Internet 102, this ticker software can comprise browser-based software or other software capable to cooperate with a web browser. According to various embodiments, the ticker can be generated and made interactive through Flash, C++, Java, HTML, or other suitable code or software.

The client terminal 108 comprises a first tuner 300 to tune to a Moving Pictures Experts Group (MPEG) stream 302 or other video source. The stream 302 may include video, live transmission, and/or application code, including corresponding text and graphic resources. In an embodiment where tickers are provided in an integrated manner along with the video signal, the ticker can be received by way of the stream 302. One skilled in the art will recognize that there will be a plurality of streams 302, depending on the number of channels and programs that the cable service provider makes available to the client terminal 108.

The first tuner 300 is coupled to a decoder 306 that decodes the video, application, and/or audio into a format that is compatible with a television set coupled to the client terminal 108. The client terminal 108 may include a second tuner 310. The second tuner 310 can work in conjunction with a cable modem 312 to obtain ticker data 314 from the Internet 102, such as via a Data Over Cable Service Interface Specifications (DOCSIS) connection with the distribution server 218. In addition to the ticker data 314, advertisements and Internet content can also be received by the client terminal 108 by way of the DOCSIS connection through the second tuner 310 and the cable modem 312. In one embodiment, the second tuner 310 can be used to obtain such advertisement data from a server (such as that used by a merchant or advertiser), remote database, Internet location or web site, or other source depicted in FIG. 1.

In addition, the client terminal 108 includes or is coupled to an input interface 315, through which other sources 316 of ticker data (including shopping data) can be provided to the client terminal 108. An example of the input interface 315 comprises an out-of-band tuner that can be used to tune to ticker data or advertisements that are provided via an out-of-band channel. In an embodiment, the out-of-band channel(s) can comprise one or more low-bandwidth frequencies carried on the same coaxial cable used to provide the MPEG streams and the Internet content. The out-of-band channel(s) tuned to by the input interface 315 to receive ticker data or advertisements can be used alternatively or in addition to the DOCSIS channel tuned to by the second tuner 310 in such an embodiment. In one embodiment, user transactions or other responses in response to information displayed in a shopping ticker may be communicated to and from the client terminal 108 via the input interface 315.

Further alternatively or in addition, the input interface 315 can comprise another television broadcast tuner (such as the first tuner 300) to tune to one or more channels that may be carrying ticker data or advertisements. For example, ticker data (including updates) and advertisements may be broadcast in one or more channel frequencies specifically dedicated for transmission of such data to client terminals 108. Thus, as an illustration, the first tuner 300 can tune to a channel showing a television program, while the input interface 315 is tuned to receive data (in the form of packets, for example) from a ticker channel or shopping channel to allow a ticker having shopping information therein to be simultaneously shown on the same television screen as the television program.

Yet another example of the input interface 315 is an interface to receive outputs of recording devices such as a PVR or a digital video recorder (DVR) that may have ticker data (including shopping information), which may be received via download. Alternatively or in addition, the input interface 315 can comprise a communication interface, such as an Ethernet connection, a digital subscriber line modem, a wireless communication interface, and so forth, which can provide a link to the server 218 to receive ticker data and advertisements, for instance.

An embodiment of the client terminal 108 may include a processor 320 to control operation of the various components shown in FIG. 3. The processor 320 may work in conjunction with ticker software or other machine-readable instructions stored on at least one machine-readable storage medium 322. Such ticker software may cooperate with the processor 320 to invoke a ticker in response to a button press on a remote control, present ticker data in a ticker template or other screen interface or user interface, configure the format and layout of the ticker displayed on the display screen of the television, select and insert an advertisement or other shopping information into a ticker, process received user commands related to responding to information presented in the ticker, and other operations. In an embodiment, the ticker software can be pre-installed in the client terminal 108. In another embodiment, the ticker software may be installed by way of download from the system 100.

An audio and video output subsection 308 of the client terminal 108 receives decoded video and/or other applications (including ticker templates and the ticker data presented therein), and provides the decoded information to a television set. A wireless interface 318 operates to receive commands from a user input device (such as a wireless remote control). Such commands can include user commands to invoke a ticker, such as when the viewer presses a BUY button, as well as other commands related to interaction with the invoked ticker, in an embodiment. The wireless interface 318 provides these commands to the processor 320 so that the processor 320 can cooperate with the ticker software to perform the corresponding operation.

In an embodiment of the invention, the storage medium 322 can also store user data 324 related to operation of the ticker. For instance, the user data 324 can include user settings for the ticker (such as location, font size, topics or other subject matter displayed, and others). In any of these storage locations, multiple sets of user data 324 may be stored, such as in implementations where multiple users in a household log into a same client terminal 108.

The storage medium 322 can include cache(s), buffer(s), or other types of storage locations where ticker data, advertisements and shopping data, or other information may be stored. For example, received sports scores can be stored in the storage medium and retrieved during the appropriate times during the course of the scrolling of the ticker. The ticker data stored in the storage medium 322 can be replaced as updates are received from the distribution server 218. In one embodiment, less time-dependent ticker information (e.g., information that need not necessarily be updated several times per day), including graphics for weather displays, game schedules, some types of advertisements or other shopping information, and the like, can be downloaded to the storage medium 322 during non-peak television viewing periods (such as late at night), and then retrieved from the storage medium 322 when that piece of information is appropriate for presentation in the ticker.

Figure 4:
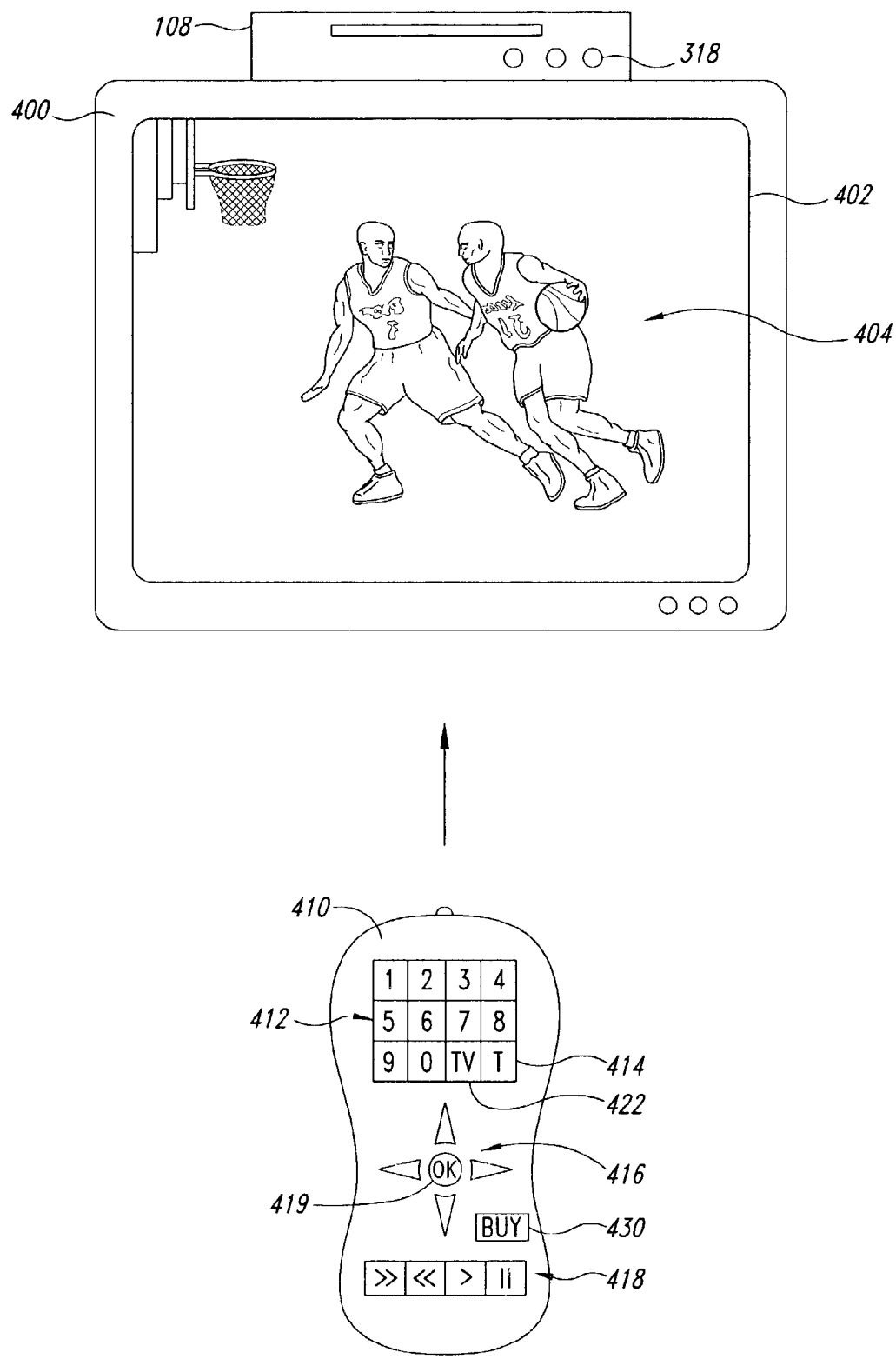
FIG. 4 is an example screen shot in conjunction with a remote control for implementing one embodiment of the invention.
Figure 5:
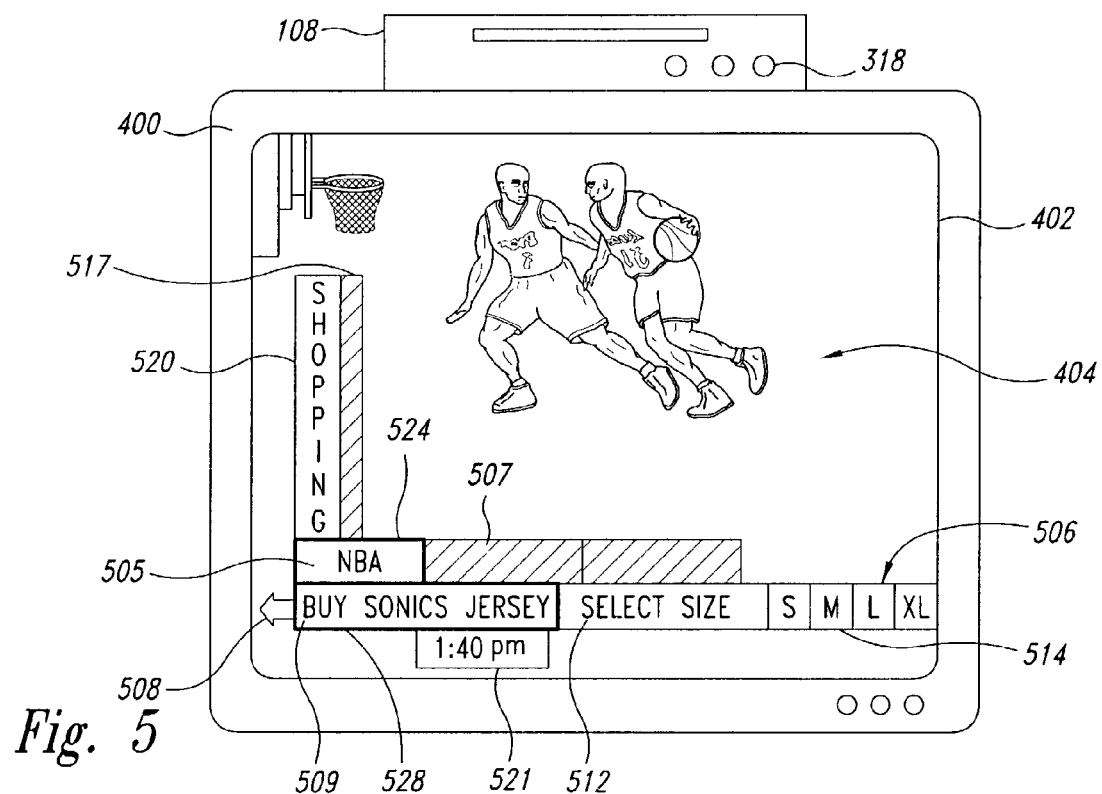
FIGS. 5-6 are screen shots depicting invocation of a shopping ticker in accordance with various embodiments of the invention.
Figure 6:
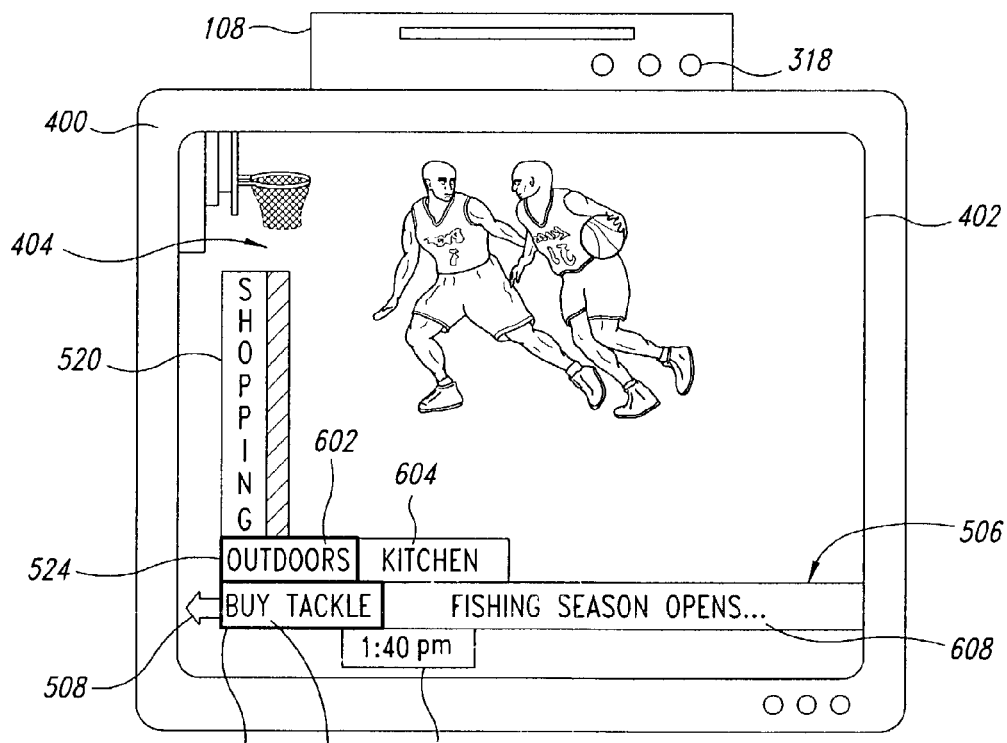

FIG. 4 is an example screen shot in conjunction with a remote control 410 for implementing one embodiment of the invention, while FIGS. 5-6 are television screen shots depicting a shopping ticker invoked in accordance with various embodiments of the invention. For simplicity of explanation, not all of the possible types of information capable of being displayed in the shopping ticker are shown or described, as such other possible information can be ascertained by examination of the features specifically shown in the figures. Moreover, it is to be appreciated that the format, layout, direction, content, and other characteristics of the ticker shown in FIGS. 5-6 are merely illustrative and that variations are possible.

In FIG. 4, a television set 400 is coupled to the client terminal 108 in a manner that allows a display screen 402 of the television set to show a television program 404. The television program 404 in this example is a basketball game, and it is appreciated that other types of television programs can be shown, such as commercials, public service announcements, and so forth. The television program 404 may be completely non-interactive or it may have at least some degree of interactivity. For instance, the television program 404 may be accompanied by triggers such that if the viewer presses an INFO button (not shown) on the remote control 410, supplemental information related to the television program (such as player statistics) is rendered on the display screen 402. According to various embodiments, the availability of the supplemental information may or may not be indicated to the viewer via on-screen icons (such as an INFO icon displayed on the display screen 402).

In other examples of interactivity, the television program 404 may comprise a commercial for an advertised product, accompanied by an on-screen BUY button or other indicator to indicate availability of a purchase opportunity. In response to the on-screen BUY button, the viewer can press a BUY button 430 on the remote control 410 to initiate an on-line transaction for the advertised product.

The wireless remote control 410 is in communication with the client terminal 108 (via the wireless interface 318) to perform conventional television-viewing operations and also to invoke and interact with a ticker, as will be described later below for an embodiment. The remote control 410 includes an alphanumeric keypad 412 that the viewer can use to select television channels or to interact with a ticker. Buttons 418 can comprise buttons that are similar to play, rewind, fast forward, pause, etc. buttons usable for recording devices or for ticker operations. Arrow keys 416 may be used for navigation within a ticker or within other applications (such as an electronic program guide), while an OK button 419 may be used to confirm viewer selections.

In an embodiment, the remote control 410 can include a ticker button 414, which if pressed when the user intentionally wishes to view a ticker, causes a command to be sent to the client terminal 108 to instruct the ticker software to render the ticker on the display screen 402. If the ticker button 414 is pressed again, the ticker is taken off the display screen 402. Alternatively or in addition, a TV button 422 can be pressed to dismiss the ticker.

As previously described above, one embodiment of the invention renders a shopping ticker having advertising information or other shopping-related information therein when the viewer presses (intentionally or unintentionally) the BUY button 430, whenever an interactive commerce opportunity is not explicitly provided for the television program 404 (such as a non-interactive commercial). For instance, the viewer might press the BUY button 430 intentionally while watching a non-interactive commercial (as the television program 404), mistakenly thinking that he can initiate an interactive purchase of the advertised product. Instead of ignoring the viewer's button press, however, an embodiment of the invention determines that a signal or user command from the remote control 410 cannot result in interaction with the television program 404 and therefore renders a shopping ticker. In another example, the viewer might press the BUY button 430 when an interactive television program (for which only non-commerce supplemental information is available via the INFO button, such as player statistics for the basketball game of FIG. 4) is being shown. Rather than being presented with the non-commerce supplemental information or being ignored, however, the viewer is presented with a shopping ticker.

It is to be appreciated that these are only a few of the possible television viewing scenarios by which the viewer may (intentionally or unintentionally) press the BUY button 430 to invoke the shopping ticker. Some other scenarios include instances where the viewer may have pressed the BUY button 430 accidentally by having "sat" on the remote control 410, when children may have been playing with the remote control 410, and so forth. Moreover in some embodiments, the remote control 410 need not necessarily have a dedicated or explicit BUY button 430 as depicted in FIG. 4. A different type of button or buttons (related to shopping or commerce) may be pressed by the viewer to invoke the shopping ticker whenever the current television program 404 does not necessarily have a commerce opportunity associated with it. Such buttons may include not only buttons on the remote control 410, but also on-screen buttons on the display screen 402 or buttons on other devices.

FIGS. 5-6 are screen shots depicting invocation of a shopping ticker in accordance with various embodiments of the invention, such as invocation after the viewer has pressed the BUY button 430 when a commerce opportunity was not originally available. A ticker 506 is shown scrolling across the bottom of the display screen 402. The ticker 506 can be in a screen interface that overlays the television program 404, or the television program 404 may be scaled appropriately on the display screen 402 to fit the screen interface for the ticker 506 and thereby avoid the need for an overlay. An embodiment of the ticker 506 displays the current time 521.

In the example of the ticker 506, the ticker 506 is scrolling from right to left (as symbolically depicted by an arrow 508). It is to be appreciated that in other embodiments, the ticker 506 may be scrolling in different directions and may also be positioned differently on the display screen 402. For the sake of illustration, the ticker 506 is shown as being set in a cycle where it is presenting NBA™ basketball advertisements (e.g., "Buy Sonics Jersey." is a moving ticker text item or advertisement 509 that is being displayed in a scroll region for a "Shopping" category 520 and an NBA™ subcategory 505). There may be any suitable number of categories 517 and subcategories 507 through which the user can navigate. In this particular example, the ticker 506 is a "shopping ticker" in that the currently selected category is the Shopping category 520—other formats of shopping tickers are possible. A navigation control 524, such as a stationary center focus box or movable selection rectangle, can be used to make navigation selections, such as to view advertisements for other subcategories or other products.

The ticker data, such as advertisements, displayed in the ticker 506 may be presented from feeds provided from the components shown in FIG. 2. Local insertion of advertisements from previous downloads is also available. Techniques for automatic advertisement insertion into a ticker that can be used by one embodiment of the invention to present a shopping ticker are disclosed in U.S. application Ser. No. 10/112,071, entitled "AUTOMATIC ADVERTISEMENT INSERTION INTO AN INTERACTIVE TELEVISION TICKER," filed Mar. 28, 2002, with inventor Thomas P. McKenna, Jr., assigned to the same assignee as the present application, and incorporated herein by reference in its entirety.

FIG. 5 illustrates one embodiment of the invention where the advertisement 509 in the ticker 506 and is directly related to or otherwise in context with the television program 404. More specifically, assuming that the television program 404 is a live Sonics basketball game, the advertisement 509 can present a purchase opportunity that is directly related to the subject matter of the television program (e.g., an advertisement to purchase a Sonics jersey in this example). Thus, while an interactive (or non-interactive) purchase opportunity was not originally present with the television program 404, pressing the BUY button 430 in conjunction with the processing of triggers has generated a new purchase opportunity (through the ticker 506) that is directly related to the television program 404.

Direct correlation between the shopping information scrolled by the ticker 506 and the content of the television program 404 can be performed via use of Advanced Television Enhancement Forum (ATVEF) triggers or other triggering mechanisms (such as those available from Wink) according to various embodiments. For instance, identification (ID) information or other information can be placed in the vertical blanking interval (VBI) of signal the television program 404 in a manner that identifies the teams in the game, the type of sport, the location of the game, time of the game, and so forth. Such ID information can be extracted and processed, based on techniques familiar to those skilled in the art having the benefit of this disclosure, to identify and select context-sensitive advertisements or other shopping information to present in the ticker 506. In the example of FIG. 5, triggers from the signal of the television program 404 have been processed by software to select the advertisement 506 (for clothing) of one of the teams identified and involved in the basketball game.

When the advertisement 509 scrolls into a center focus box 528, the viewer can then press the INFO button or the OK button 419 on the remote control 410 so as to view additional details of the advertisement for purposes of beginning a purchase transaction. In one embodiment, responding to the advertisement 509 in this manner results in access of additional information via a hyperlink or other link (which may include channel tuning), including display of the additional information in a pop-up window or PIP window. The advertisement 509 can be presented within the scroll region of the ticker 506 (or in other areas on the display screen 402) in bold, in a different color (which may indicate a hyperlink or other link), accompanied with an icon, underlined, or via some other technique to alert the viewer that he can interact with the advertisement 509 to perform a purchase.

Alternatively or in addition, the ticker 506 may present such additional information within its scroll region itself in a manner that the viewer can perform a purchase through the ticker interface. For instance a prompt 512 can advise the viewer to select a jersey size and a corresponding selection 514 of sizes S, M, L, and XL. According to one embodiment of the invention, the viewer may then perform the resulting purchase transaction within the ticker 506 itself by waiting for the prompt 512 and the selections 514 to scroll into the center focus box 528, and pressing the OK button 419 at the appropriate times. Other suitable techniques for entering viewer responses may be used, such pressing a number assigned to a selection item or by navigating to a selection via a movable selection rectangle.

In other embodiments, transaction windows (such as HTML web pages or pop-up windows) can be rendered on the display screen 402, through which the viewer can make selections and perform other purchase actions. In yet other embodiments, the ticker 506 can scroll telephone numbers, addresses, web site URLs, or other such information that the viewer can use to contact a merchant to purchase the advertised products independently of performing the transaction through the ticker 506.

After the viewer has responded to all of the items scrolled by the ticker 506 that require a response, the viewer-entered information is sent to the merchant. The ticker 506 can then continue to scroll additional advertisements, in the event that the viewer wishes to make additional purchases or continue perusing advertised products. Accordingly, as shown and described above, providing the capability to present advertisements within the ticker 506 and the capability to conduct the resulting transaction within the ticker 506 results in little or no interruption of the television program 404, since the ticker only occupies a minority portion of the display screen 402. By minimizing viewer annoyance while watching television, the chances that the viewer will attain and maintain an interest in an advertised product increases.

FIG. 6 illustrates an example of when the ticker 606 is invoked in a manner described above via the BUY button 430, except that the advertisement information in the ticker 606 is not necessarily context-sensitive to the content of the television program 404. In FIG. 6, the ticker 506 is scrolling advertisements from an Outdoors shopping subcategory 602 within the shopping category 520, while the basketball television program 404 is playing (e.g., the ticker 506 is scrolling ticker items unrelated to the television program 404). Since the navigational control 524 is positioned on the Outdoors subcategory 602, the ticker 506 currently scrolls an advertisement 606 related to fishing (e.g., "Buy tackle").

While the advertisement 606 is within the center focus box 528, the viewer can press the OK button 419 or the INFO button to conduct a transaction. Once the Outdoors advertisements finish scrolling, the ticker 506 may scroll related news clips from the same shopping subcategory (e.g., a "Fishing season opens" headline 608) or scroll advertisements from another shopping subcategory, such as a Kitchen subcategory 604.

Figure 7:
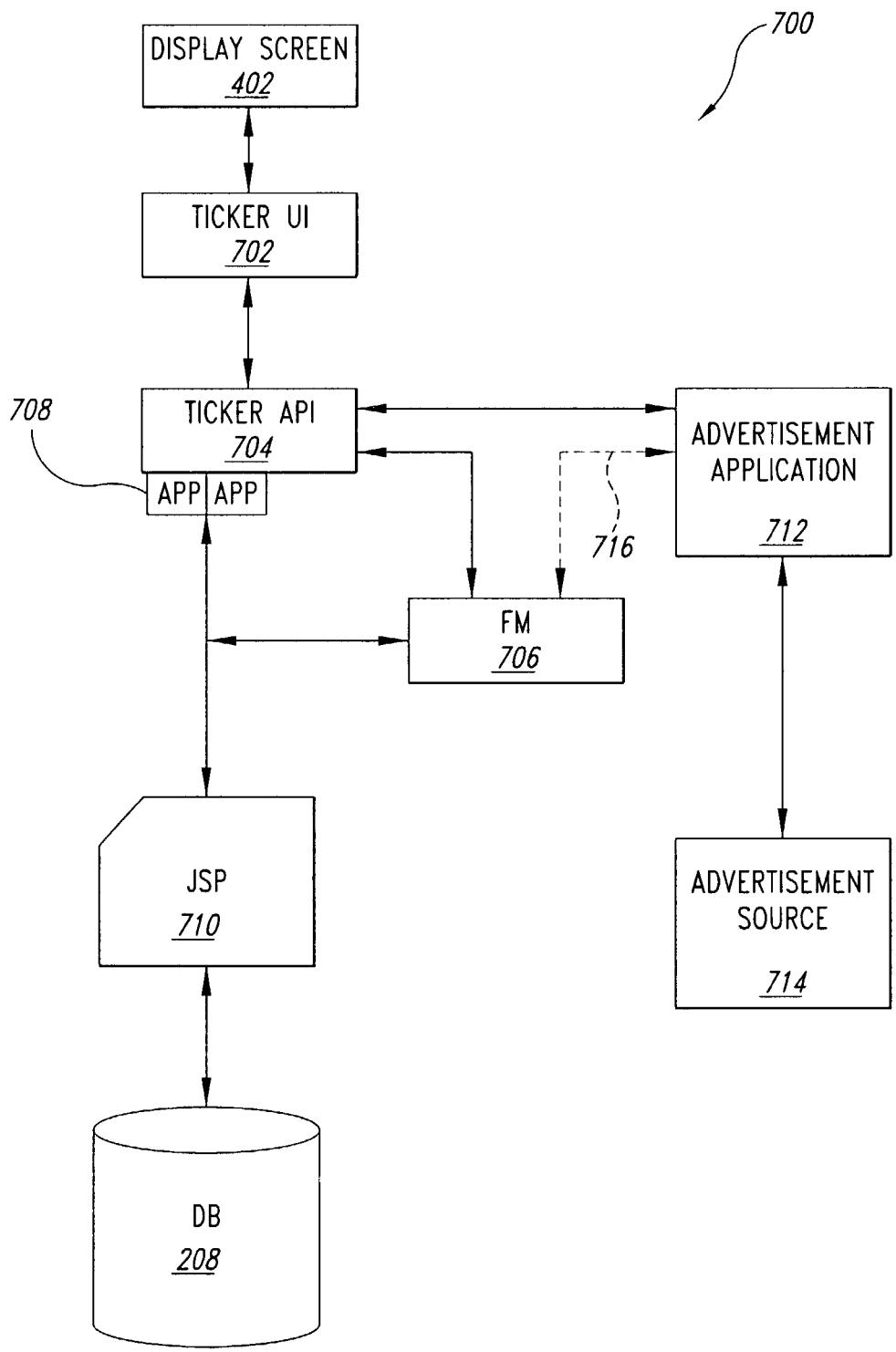
FIG. 7 is a block diagram illustrating components that can interact to present a shopping ticker according to an embodiment of the invention.

FIG. 7 is a block diagram 700 illustrating components that can interact to present shopping information, including advertisements, in the ticker 506 according to an embodiment of the invention. At least some of the components of FIG. 7 can be embodied in software or other machine-readable instruction stored on a machine-readable medium, such as the storage medium 322. An embodiment of the ticker software includes a ticker user interface (UI) 702 that presents the ticker 406 on the display screen 402, as well as being able to receive and process viewer responses. A ticker application program interface (API) 704 interacts with the ticker UI 702 to control what the ticker UI displays, how to display, when to display, and so forth. In an embodiment, the ticker API 704 provides shopping data to the ticker UI 702, as well as processing user commands that interact with the shopping ticker during transactions (if necessary) and that are entered via the ticker UI 702.

The ticker API 704 interfaces with a plurality of applications 708. These applications can include a sports application, news application, weather application, or other applications associated with categories that the ticker 406 can present to the viewer. A feed manager (FM) 706 (or other software controller) operates to determine when new or updated ticker information is present and needs to be provided to the ticker API 704. It is appreciated that some embodiments need not necessarily implement an API to integrate ticker functionality. In such embodiments, at least some of the ticker functionality can be coded into an operating system without use of an API.

To generally describe operation of the ticker 506 in an example embodiment, the ticker API 704 logs and knows what the ticker 506 is displaying, and also knows how often the displayed information needs to be refreshed (based on business rules or other requirements present in functions defined in the ticker UI 702). In an embodiment, there may be rules in the ticker UI level that define when at least some of the advertisements are to be presented. If it is time for an update, the ticker API 704 (acting as a container of data) calls a load function that will cause the feed manager 706 to loop through the applications 708 to search for new data, and if there is new data, the feed manager 706 will pass the new data from the application(s) 708 to the ticker API 704 so that the ticker API 704 can pass the new data to the ticker UI 702.

In another embodiment, the ticker API 704 manages the information that the ticker UI 702 will display, but it does not have knowledge of what the ticker UI 702 displays and when it is displayed. The ticker UI 702 invokes the lower level components via method calls to retrieve business objects. This means that the invocations of these lower levels are done potentially many times for each accessor/factory method to get a particular business object (assuming that there may be more than one business object needed to gather all data), including objects associated with advertisements. There are at least two routes that the ticker UI 702 can take in an embodiment.

First, the ticker UI 702 invokes the feed manager 706. This is done in situations when the business object contains some data that needs to be refreshed periodically during the session. The feed manager 706 receives several arguments that tell it which method in the ticker API 704 will return the business object, how frequently the feed manager 706 should poll this business logic, and the name of the ticker UI variable (a collection such as an array) that holds the properties of the business object for the ticker UI 702 components to use and display. The feed manager 706 calls the ticker API 704 immediately, and then at the intervals specified by the ticker UI 702. Second, the ticker UI 702 invokes the ticker API 704 directly. This bypasses the feed manager 706 and is done for data that only needs to be instantiated once during the session.

In one embodiment for the ticker 506 where the feed manager 706 (not the ticker API 704) knows when it is time for an update, the process can be as follows. The ticker UI 702 calls the ticker API 704 to start a feed. The ticker API 704 calls the feed manager 706, and the feed manager 706 constructs a callback object. The feed manager 706 returns an empty object array to the ticker API 704, which in turn returns the empty object array to the ticker UI 702.

The feed manager 706 calls an appropriate application 708 for a business object, and the business object(s) is returned to the feed manager 706 in an array, a copy of which is saved by the feed manager 706 as a business object array. The feed manager 706 returns the object array to the ticker UI 702 can calls a HandleLoad function, for instance.

At a particular interval, the feed manager 706 calls an application 708 for new information. The business objects are returned to the feed manager 706 by the application 708 in an array, and the feed manager 706 checks that array with the saved array for different information. If the content has changed, then the feed manager 706 returns an object array to the ticker UI 702 and calls a HandleLoad function. The ticker UI 702 calls the ticker API 704 to stop a feed. The ticker API 704 calls the feed manager 706 to stop the feed, and the feed manager 706 stops the feed.

To obtain new ticker data, in an embodiment, the application(s) 708 calls a Java server page (JSP) 710 at a web server (which may be located at the distribution server 218). Java objects at the web server will then communicate with the database 208 to obtain the appropriate ticker information. The Java objects will then construct XML code from the ticker information obtained from the database 208, and send the XML code to the corresponding application 708. The application 708 then converts the XML code to local data objects, in one embodiment, and returns the object(s) to the ticker API 704. The ticker API 704 subsequently sends the object(s) to the ticker UI 702 for display in the ticker 506.

In an embodiment, the ticker API 704 formats the data to be provided to the ticker UI 702, including advertisement data, in a manner that the viewer can interact with the advertisement at the ticker UI 702 level. For instance, the ticker API 704 can format the ticker data to provide such data with hypertext links or with other links to additional product information or to a merchant website. This formatting may include defining objects or functions that link to such advertising information.

As an example illustrated in FIG. 7, the ticker API 704 can be communicatively coupled to an advertisement application 712, so that the ticker API 704 can be provided with advertisement data to pass to the ticker UI 702 for presentation. Also, the ticker API 704 can communicate with the advertisement application 712 to receive additional advertisement information requested by the viewer, to pass viewer responses for transactions to the advertisement application 712, to obtain advertisement data from the advertisement application 712 for presentation at the ticker UI 702 based on certain rules, or to perform other operations.

In an embodiment, the advertisement application 712 can comprise a software module or program that can retrieve the requested advertisement information from an advertisement source 714, and then provide the requested information to the ticker API 704 or otherwise cause an advertisement to be displayed on the display screen 402. One example of the advertisement application 712 is a browser, such as a web browser. In a browser-based or other implementation, the advertisement application 712 can include an HTML-to-text conversion component or other suitable conversion component that can convert an advertisement from an original format (such as HTML, audio, video, etc.) to a text or other data format suitable for presentation within the ticker 506.

In other examples, the advertisement application 712 can comprise other types of software, familiar to those skilled in the art having the benefit of this disclosure, that can retrieve advertisements from the advertisement source(s) 714, including servers, web sites, local storage (such as the storage medium 322 having advertisements downloaded therein, which may be based on a viewer profile in some instances), carousel broadcast advertisement channel, or other sources depicted in FIGS. 1-2. The advertisement application 712 can include or otherwise interact with trigger processing software that process triggers in a television signal, and then use the information from the triggers to select an in-context advertisement from the advertisement source 714.

The advertisement application 712 can provide the retrieved information to the ticker API 708 so that the information can be formatted for display within the ticker 406, such as depicted in FIGS. 5-6. It is to be appreciated that in other embodiments, some of the advertisement data (including data associated with a transaction) can be communicated between the ticker UI 702 and the advertisement application 712 without necessarily having to go through the ticker API 704. Alternatively or in addition, the advertisement application 712 can issue commands to components of the client terminal 108 (such as the tuners 300 or 310, or the input interface 318) so that these components can tune to the advertisement source 714 to obtain advertisement data.

In one embodiment, the various data exchanged between the ticker API 704, the application(s) 708, and the advertisement application 712 (such as textual advertisement information to be displayed within the ticker 506) can comprise objects, or arguments that are passed in calls. The feed manager 706 can operate in one embodiment to control the communication of data between the ticker API 704 and the advertisement application 712, including interacting with the advertisement application 712 to determine if there are updated advertisements that are available. It is to be appreciated that the feed manager 706 need not be involved in operations related to providing advertisements (and related transaction data) in some embodiments (and is therefore symbolically depicted by a broken line 716 in FIG. 7).

Figure 8:
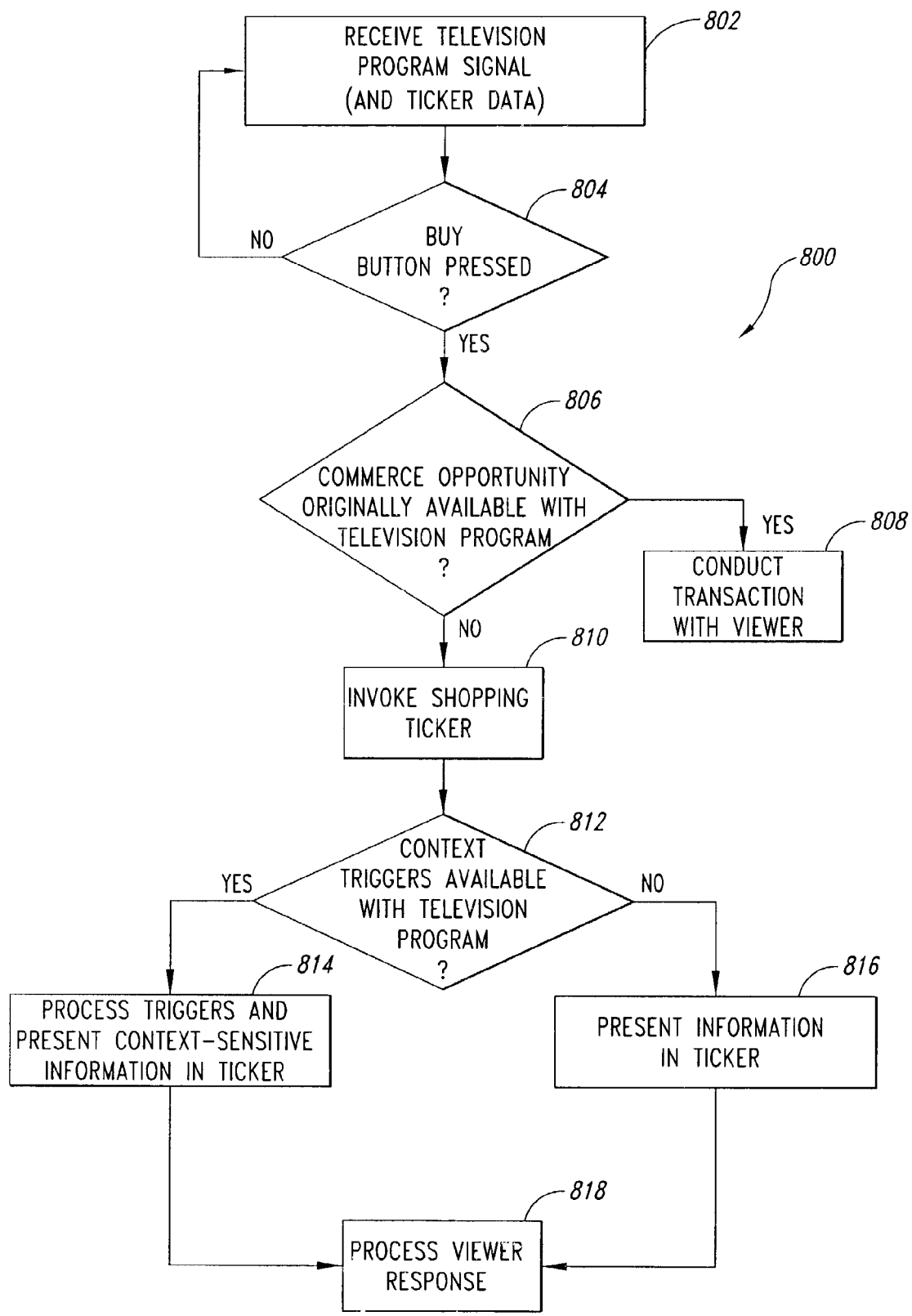
FIG. 8 is a flowchart illustrating invocation and presentation of a shopping ticker according to an embodiment of the invention.

FIG. 8 is a flowchart 800 illustrating invocation and presentation of the ticker 506 according to an embodiment of the invention. Elements of the flowchart 800 may be embodied in software or other machine-readable instruction stored on a machine-readable medium, such as the storage medium 322. Moreover, operations shown in the flowchart 800 need not necessarily occur in the exact order shown.

Beginning at a block 802, a television program signal is received by the client terminal 108, resulting in the display of the television program 404 on the display screen 402. As described above, the television program signal may be non-interactive or may have interactivity that does not include interactive purchase opportunities. Ticker data may also be received at the block 802, including ticker data that may be downloaded or cached for later presentation, or ticker data that is presented in a ticker shown along with the television program 404 (e.g., a news ticker, sports ticker, or other ticker different from a shopping ticker that may be normally invoked with the ticker button 414).

At a block 804, software (in cooperation with suitable hardware) in the client terminal 108 monitors whether the BUY button 430 has been pressed. In one embodiment, such software can comprise the ticker UI 702, such that if a signal or user command corresponding to a press of the BUY button 430 is received from the remote control 410, the ticker UI 702 causes the shopping ticker 506 to be rendered according to the conditions to be described below. In other embodiments, the software to monitor for the press of the BUY button 430 and to determine if conditions are appropriate for invoking the shopping ticker 506 can comprise other software in the client terminal 430 that can instruct the ticker UI 702 or other ticker software to invoke the ticker 506.

If the BUY button 430 has not been pressed at the block 804, then the client terminal 108 continues to receive and present the television program signal at the block 802. If, however, the BUY button 430 has been pressed, then the software determines at a block 806 whether a commerce opportunity is originally available with the television program 404. This determination may be done, for instance, by processing the television program signal to determine if the received user command (e.g., the pressing of the BUY button 430) is applicable to interactive purchase triggers, merchant URLs, or other interactive purchase information that has been sent with the television program signal. If such a commerce opportunity is originally available (e.g., the television program 404 is presented along with an interactive purchase trigger), then the method 800 proceeds to a block 808 to conduct a resulting transaction with the viewer. The transaction conducted with the viewer at the block 808 can use techniques, user interfaces, or other processes and technology familiar to those skilled in the art having the benefit of this disclosure.

If an original commerce opportunity is determined to be unavailable at the block 806 (such as if the received user command is inapplicable to interactivity with the received television program signal or is unable to result in interaction with the television program, including situations where the received television program or its signal is completely non-interactive), then the method 800 proceeds to a block 810 to invoke the shopping ticker 506 in response to the press of the BUY button 430. Invocation of the shopping ticker 506 at the block 810 can comprise, at least initially, having the ticker UI 702 render the scroll regions, graphics, and other layout and format of the template for the shopping ticker 506. The operations at the block 810 can also include having the ticker API 704 work in conjunction with the feed manager 706 and/or the advertisement application 712 to initially obtain (or get ready to obtain) at least some of the shopping information to place into the template of the shopping ticker 506.

For embodiments where the shopping information to be presented in the shopping ticker 506 is context-sensitive with the subject matter of the television program 404, trigger processing software determines whether context and/or content triggers are available with the television program 404 at a block 812. Such triggers can include triggers that identify, for instance, the teams playing in a game, a sponsor or merchant associated with a television commercial, time of year, names of individuals in the program, and so forth. These triggers are extracted, identified, or otherwise processed at a block 814, and used to select and present context-sensitive shopping information in the shopping ticker 506. Such selection can include, for example in one embodiment, passing the trigger information to the advertisement application 712 and having the advertisement application 712 select the appropriate advertisement(s) from the advertisement source 714 based on the trigger information. The selected advertisements are then passed by the advertisement application 712 to the ticker API 704 or directly to the ticker UI 702 for presentation within the shopping ticker 506.

For embodiments where the information in the shopping ticker 506 is not context-sensitive (or where context triggers are determined to be unavailable at the block 812), shopping information of a more general nature is presented in the ticker 506 at a block 816. Thereafter, viewer responses to the presented shopping information are processed at a block 818, such as requests for additional details, menu selections, and other actions associated with the purchase experience.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

As an example, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 106) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission when appropriate.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method performed by an interactive television system, the method comprising:
    presenting a television program provided via a television program signal on a display screen;
    receiving, after the television program has begun being presented on the display screen, a specifically-designated user command for making a purchase;
    determining, in direct response to receiving the specifically-designated user command, whether an interactive commerce opportunity is explicitly provided for the television program; and
    in response to said interactive commerce opportunity not being explicitly provided:
        determining whether a context trigger has been previously received with the television program; and
        in response to a context trigger having been previously received with the television program, superimposing a ticker over the presented television program, the ticker comprising a context-sensitive advertisement related to the television program, the advertisement being selected based on the context trigger.

2. The method of claim 1 wherein receiving comprises detecting activation by a user of a specifically-designated button on a user input device for making a purchase while showing a full-screen presentation of a television program.

3. The method of claim 1 further comprising: in response to a shopping trigger having not been received with the television program, superimposing a ticker over the presented television program, the ticker comprising an advertisement that is not context-sensitive.

4. The method of claim 2 wherein the button on the user input device comprises a BUY button.

5. The method of claim 1 wherein the user command is specifically designated to initiate a purchase related to subject matter of the presented television program.

6. The method of claim 1, wherein the context trigger comprises an ATVEF trigger.

7. The method of claim 1 wherein the context trigger is received independent of electronic program guide data.

8. The method of claim 1 wherein the context trigger is received within a vertical blanking interval of the television program.

9. The method of claim 1, further comprising conducting a transaction with a user within the ticker, if the user responds to the advertisement in the ticker.

10. The method of claim 1, wherein superimposing a ticker comprises displaying a scrolling ticker in which the advertisement is scrolled into and out of a center-focus area.

11. The method of claim 10, wherein displaying a scrolling ticker comprises horizontally scrolling the advertisement within the ticker.

12. The method of claim 10, wherein displaying a scrolling ticker comprises vertically scrolling the advertisement within the ticker.

13. The method of claim 10, further comprising initiating an interactive commerce opportunity in response to a second user command being received when the advertisement scrolls into the center-focus area.

14. An article of manufacture, comprising:
a machine-readable medium having instructions stored thereon to:
detect activation by a user of a specifically-designated button on a user input device for making a purchase while showing a full-screen presentation of a television program;
determine, in direct response to activation of said specifically-designated button, whether an interactive commerce opportunity is explicitly provided for the television program; and
in response to said interactive commerce opportunity not being explicitly provided:
determine whether a context trigger has been previously received with the television program; and
in response to a context trigger having been previously received with the television program, superimpose a ticker over the presented television program, the ticker comprising a context-sensitive advertisement selected based on the context trigger.

15. The article of manufacture of claim 14 wherein the context trigger comprises an ATVEF trigger.

16. The article of manufacture of claim 15 wherein the context trigger is received independent of electronic program guide data.

17. The article of manufacture of claim 14 wherein the specifically-designated button corresponds to a BUY button.

18. The article of manufacture of claim 14 wherein the machine-readable medium further includes instructions stored thereon to conduct a transaction within the ticker in response to the advertisement.

19. An apparatus, comprising:
a means for detecting activation by a user of a button on a user input device for making a purchase while showing a full-screen presentation of a television program;
a means for determining, in direct response to activation of said button, whether an interactive commerce opportunity is explicitly provided for the television program; and
a means for determining, in response to said interactive commerce opportunity not being explicitly provided, whether a context trigger has been previously received with the television program and, in response to a context trigger having been previously received with the television program, displaying a ticker in connection with the presented television program, the ticker comprising a context-sensitive advertisement selected using the context trigger.

20. The apparatus of claim 19, further comprising a means for selecting the advertisement to be in context with subject matter of the presented television program.

21. The apparatus of claim 19 wherein the context trigger comprises an ATVEF trigger.

22. An apparatus for a video casting system, the apparatus comprising:
at least one communication interface to receive a signal having a television program;
an output section to display a presentation of the television program;
a wireless interface to detect activation of a specifically-designated button on a user input device to make a purchase during the presentation of the television program;
a storage medium coupled to the wireless interface to store a software program;
a processor, coupled to the storage medium and to the communication and wireless interfaces, to cooperate with the software program to determine, in direct response to activation of said specifically-designated button, whether an interactive commerce opportunity is explicitly provided for the television program; and in response to said interactive commerce opportunity not being explicitly provided:
determine whether a context trigger has been previously received with the television program; and
in response to a context trigger having been previously received with the television program, display a ticker on the presented television program, the ticker comprising a context-sensitive advertisement selected based on the context trigger.

23. The apparatus of claim 22 wherein the software program includes a ticker software program having:
a ticker user interface (UI) to present the advertisement within the ticker;
a ticker application program interface (API) in communication with the ticker UI to control presentation of the advertisement by the ticker UI; and
an advertisement application in communication with the ticker API to select and provide the advertisement to the ticker API.

24. The apparatus of claim 23 wherein the advertisement application includes code to select the advertisement to be context-sensitive to subject matter of the television program.

25. The apparatus of claim 22 wherein the specifically-designated button comprises a BUY button.

26. A video casting system, comprising:
a source of ticker data; and
an apparatus coupled to the source, the apparatus including:
at least one communication interface to receive a signal having a television program;
an output section to display a presentation of the television program;
a wireless interface to receive a user command during the presentation of the television program;

a storage medium coupled to the wireless interface to store a software program;

a processor, coupled to the storage medium and to the communication and wireless interfaces, to cooperate with the software program to determine, in direct response to activation of said user command, whether an interactive commerce opportunity is explicitly provided for the television program in response to the user command; and in response to said interactive commerce opportunity not being explicitly provided, superimpose a ticker over the presented television program, the ticker comprising a context-sensitive advertisement selected based on a previously-received context trigger.

27. The system of claim 26 wherein the software program includes code to select the advertisement to be in context with subject matter of the television program.

28. The system of claim 26 wherein the specifically-designated button comprises a BUY button.

29. The system of claim 26 wherein the context trigger comprises an ATVEF trigger.

30. A method usable in a video casting system, the method comprising:

receiving a signal having a television program and showing a full-screen presentation of the television program on a display screen, wherein the display screen comprises at least a part of a television for the video casting system, wherein a client terminal for the television is coupled to the display screen, wherein the video casting system includes a plurality of sources, which provide ticker data for a ticker capable of being rendered on the display screen, the plurality of sources being communicatively coupled to a plurality of broadcast centers, wherein at least one of the broadcast centers is coupled to a server capable to provide the ticker data from the sources to the client terminal, and wherein the video casting system is capable to provide the ticker data to the client terminal via different communication channels, including at least one of a plurality of television broadcast channels, an out-of-band channel, and a communication channel with a communication network;

receiving a user command at the client terminal;

detecting activation by a user during the presentation of the television program of a specifically-designated button on a user input device for making a purchase;

determining, in direct response to said activation, whether an interactive commerce opportunity is explicitly provided for the television program; and in response to said interactive commerce opportunity not being explicitly provided, superimposing a scrolling ticker over the presented television program, the ticker comprising a context-sensitive advertisement that is horizontally or vertically scrolled through a center-focus area of the ticker.

31. The method of claim 30, further comprising selecting the advertisement in the ticker to be context-sensitive to subject matter of the television program.

32. The method of claim 30 wherein the specifically-designated button comprises a BUY button.

33. A video casting system, comprising:

a source of ticker data including:

a feed server to receive a plurality of feeds of ticker data and having a feed engine to manipulate the ticker data received from the feeds;

a production server coupled to the feed server to receive the ticker data manipulated by the feed engine, and coupled to a database having tables for the manipulated ticker data received from the feed server, the production server being capable to change a format of the manipulated ticker data to a format compatible with client terminals configured to present a screen interface on a display screen; and a distribution server to send the manipulated ticker data having the format compatible with the client terminals; and an apparatus coupled to the distribution server of the source, the apparatus including:

at least one communication interface to receive a signal having a television program;

an output section to display a full-screen presentation of the television program;

a wireless interface to receive a user command during said full-screen presentation of the television program;

a storage medium coupled to the wireless interface to store a software program;

a processor, coupled to the storage medium and to the communication and wireless interfaces, to cooperate with the software program to determine, in direct response to said user command, whether an interactive commerce opportunity is explicitly provided for the user command in the television program and, in response to said interactive commerce opportunity not being explicitly provided, determine whether a context trigger has been previously received with the television program and, in response to a context trigger having been previously received with the television program, superimpose a ticker over the presented television program, the ticker comprising a context-sensitive advertisement selected based on the context trigger.

34. The system of claim 33 wherein the source of ticker data comprises part of a satellite television delivery system.

35. The system of claim 33 wherein the specifically-designated button comprises a BUY button.

36. The system of claim 33 wherein the software program comprises part of an operating system of the apparatus, the software program including code related to operation of the ticker.

37. The system of claim 33 wherein the television program comprises a television commercial.

* * * * *